United States Patent
Shirakata et al.

(10) Patent No.: US 8,179,782 B2
(45) Date of Patent: May 15, 2012

(54) SIGNAL JUDGMENT APPARATUS AND SIGNAL JUDGMENT METHOD

(75) Inventors: Naganori Shirakata, Osaka (JP); Shuya Hosokawa, Osaka (JP); Kenji Miyanaga, Osaka (JP); Koji Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 717 days.

(21) Appl. No.: 12/376,157

(22) PCT Filed: Feb. 1, 2008

(86) PCT No.: PCT/JP2008/051642
§ 371 (c)(1),
(2), (4) Date: Feb. 3, 2009

(87) PCT Pub. No.: WO2008/136200
PCT Pub. Date: Nov. 13, 2008

(65) Prior Publication Data
US 2010/0008346 A1 Jan. 14, 2010

(30) Foreign Application Priority Data
Apr. 27, 2007 (JP) ................................. 2007-118670

(51) Int. Cl.
*H04J 11/00* (2006.01)
(52) U.S. Cl. .................. 370/208; 370/329; 375/147
(58) Field of Classification Search .......... 370/203–211, 370/328, 329, 342, 343; 375/147, 260
See application file for complete search history.

(56) References Cited

U.S. PATENT DOCUMENTS

2006/0018393 A1* 1/2006 Gore et al. .................... 375/260
2006/0056530 A1  3/2006 Nakao
2010/0189167 A1* 7/2010 Pare et al. .................... 375/219

FOREIGN PATENT DOCUMENTS
JP  3754441  12/2005

OTHER PUBLICATIONS

International Search Report issued May 1, 2008 in the International (PCT) Application of which the present application is the U.S. National Stage.
Syed Aon Mujtaba, Agere Systems, TGn Sync Proposal Technical Specification, IEEE 802.11/04/889r0.doc, Aug. 2004, pp. 94, 95, 100, 101, 110, 111, 120-123.

* cited by examiner

*Primary Examiner* — Luat Phung
(74) *Attorney, Agent, or Firm* — Wenderoth, Lind & Ponack, L.L.P.

(57) ABSTRACT

An FFT unit (170) separates a received symbol by Fourier conversion into a plurality of subcarriers, and a phase difference detection unit (193) detects a phase difference between 4 pilot carriers and data carriers adjacent to the pilot carriers (adjacent carriers) The decision unit (194) decides whether the phase differences between the pilot carriers and the adjacent carriers detected by the phase difference detection unit (193) fulfill a phase difference condition. Then, the decision unit (194) decides that the received symbol is an HTSIG if the number of phase differences that fulfill the phase difference condition is greater than or equal to a predetermined number, and decides that the received symbol is either a SIG or a DATA if the number of phase differences that fulfill the phase difference condition is less than the predetermined number.

9 Claims, 12 Drawing Sheets

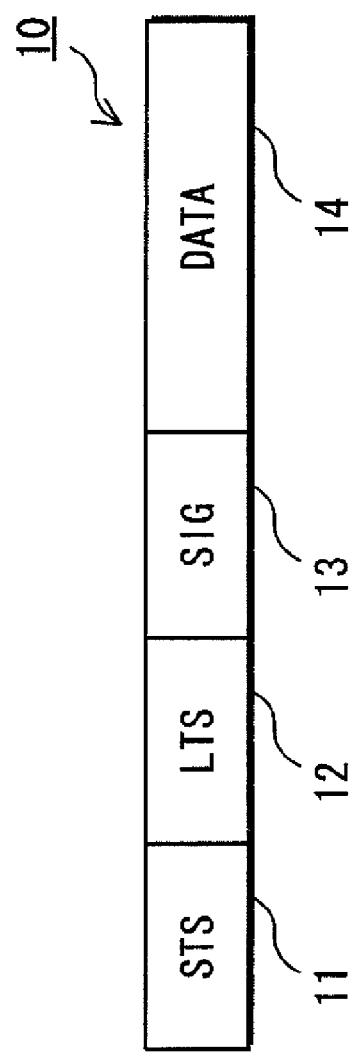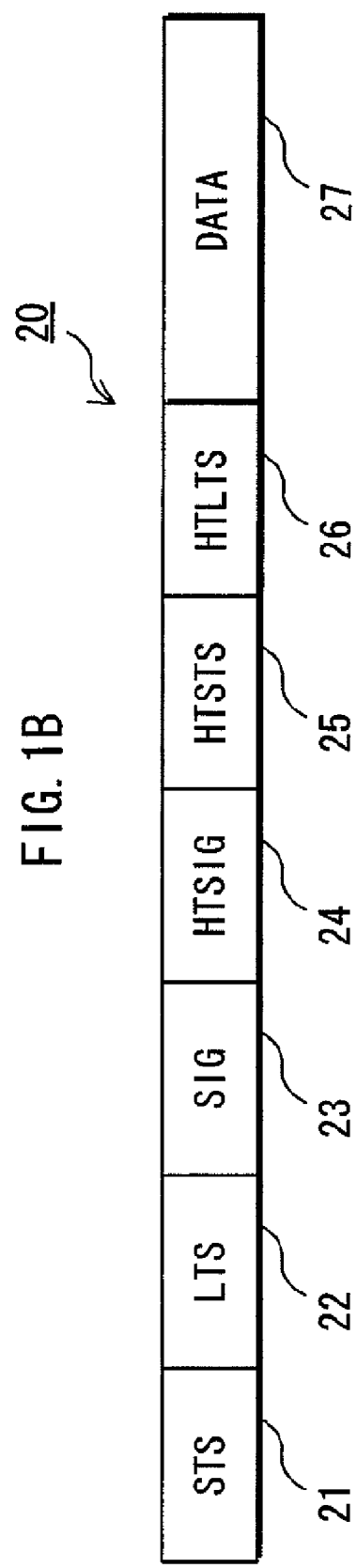

SIGNAL JUDGMENT APPARATUS AND SIGNAL JUDGMENT METHOD

TECHNICAL FIELD

The present invention relates to technology, used in a wireless system such as a wireless LAN (Local Area Network) system, for receiving signals that have been frequency division multiplexed.

BACKGROUND ART

In recent years, there has been widespread use in offices and homes of wireless LANs that are compliant with an IEEE (Institute of Electrical and Electronics Engineers) 802.11 standard.

Since cable connection of wireless communication devices is unnecessary in wireless LANs, wireless LANs are suited for wireless communication by battery-powered mobile wireless communication devices. There is a desire to use this type of battery-powered wireless communication device continuously for a longer period, and lowering the power consumption thereof is a major issue.

Meanwhile, there is a desire to further increase transmission speed in wireless LANs, and a method has been proposed of forming a MIMO (Multiple Input Multiple Output) channel that uses a plurality of transmission antennas and a plurality of reception antennas, and performing multiplex transmission of transmission signals via a plurality of paths by space dividing between transmission and reception terminals.

Also, another method has been proposed for further increasing the transmission speed in wireless LANs by merging a plurality of adjacent frequency channels together, thus expanding the channel bandwidth used for wireless communication.

At present, as a standard for the latter method, planning is underway for an IEEE 802.11n standard (hereinafter referred to as an "11n standard"), which is a higher-level standard than an IEEE 802.11a standard (hereinafter referred to as an "11a standard").

The 11n standard uses the OFDM (Orthogonal Frequency Division Multiplexing) method that is the same as in the pre-existing 11a standard.

Also, the 11n standard stipulates that a frame format shown in FIG. 1B can be used for causing a wireless communication device compatible with the 11a standard (hereinafter referred to as an "11a terminal") and a wireless communication device compatible with the 11n standard (hereinafter referred to as an "11n terminal") to have exchangeability with each other when both the 11a terminal and the 11n terminal use the same frequency band to perform communication. The 11n standard stipulates that, in addition to the frame format of FIG. 1B (hereinafter referred to as an "11n format"), for example the frame format of FIG. 1A defined by the 11a standard (hereinafter referred to as an "11a format") can also be used as the frame format.

Note that STS means "Short Training Symbol", LTS means "Long Training Symbol", SIG means "SIGNAL Symbol", and DATA means "DATA symbol". Also, HTSIG means "High Throughput SIGNAL Symbol", HTSTS means "High Throughput Short Training Symbol", and HTLTS means "High Throughput Long Training Symbol".

In the 11n standard, when two streams are multiplexed by MIMO multiplexing and transmitted, the 11n terminal transmits, from a first antenna, a transmission signal in a frame format 50 shown in FIG. 12, and transmits a transmission signal in a frame format 60 from another antenna "CS" in FIG. 12 indicates cyclic shift. Cyclic shift refers to a known method used when transmitting an identical transmission signal from a plurality of antennas at the same time to prevent unintended beam forming by adding time lags to transmission signals in advance and transmitting the transmission signals from a plurality of antennas.

The 11n terminal adds a time lag CS1 to two transmission signals in the 11a parts (STS, LTS, SIG, HTSIG) that transmit the identical transmission signal, and performs transmission. And the 11n terminal adds a time lag CS2 that is different from the time lag CS1 to the two transmission signals in the 11n parts (HTSTS, HTLTS, DATA) that perform MIMO multiplexing, and performs transmission.

Since the time lags added to the two transmission signals are thus different between the 11a parts and the 11n parts, the characteristics of amplitude and phase of space-multiplexed signals are also different between the 11a parts and the 11n parts. For this reason, gain adjustment, frequency synchronization, symbol synchronization, etc. performed on the first of the 11a parts are not necessarily optimal in the 11n parts, and it is preferable to perform adjustments such as gain adjustment, frequency synchronization, symbol synchronization, etc. on the first of the 11n parts.

For example, to perform adjustments such as gain adjustment, frequency synchronization, symbol synchronization, etc. again on the first of the 11n parts in an environment in which both 11a format signals and 11n format signals coexist, it is necessary to decide whether a type of received signal is an 11a format signal or an 11n format signal.

As technology for performing the above-described decision, for example, there is a conventional technology for deciding whether the type of received signal is an 11a format signal or an 11n format signal by deciding whether a symbol following an SIG is an HTSIG (for example, see patent document 1).

In this conventional technology, the 11n terminal estimates a channel characteristic of the channel according to an LTS, equalizes pilot carriers included in the symbol following the LTS according to the estimated value of the channel characteristic, and reconstructs the transmission data by demapping the results of the equalization. Then, the 11n terminal decides whether the symbol following the SIG is an HTSIG by deciding whether the result of the reconstruction matches a known pattern of the pilot carrier of the HTSIG. The 11n terminal decides that the received signal is an 11n format signal if the symbol following the SIG is an HTSIG, and that the received signal is an 11a format signal if the symbol following the SIG is not an HTSIG.

Patent document 1: Japanese Published Patent Application No. 3754441.

DISCLOSURE OF THE INVENTION

Problem Solved by the Invention

Meanwhile, readjustment of gain etc. is performed in the 11n parts with use of an HTSTS that is first of the 11n parts following the HTSIG. For this reason, it is desirable to specify within a short period after receiving the HTSIG that a received signal is an 11n format signal.

However, in the above-described conventional technology, the type of received signal is decided by performing equalization processing, demapping processing, and comparing processing on the pilot carriers. For this reason, specifying the type of received signal is not necessarily completed within a short period after receiving the HTSIG.

In view of this, the present invention aims to provide a signal decision apparatus and signal decision method that can decide the type of received signal in a short period.

Means to Solve the Problem

In order to achieve the above aim, the signal decision apparatus of the present invention is a signal decision apparatus for deciding a type of a received signal that is constituted from a plurality of subcarriers frequency division multiplexed with each other, including: a subcarrier separation unit operable to separate the received signal into the plurality of subcarriers, including a pilot carrier and a data carrier; and a type decision unit operable to decide, according to a relationship between the pilot carrier and the data carrier obtained as a result of the separation by the subcarrier separation unit, whether the received signal is a predetermined type of frequency-multiplexed signal including a pilot carrier that has been modulated in accordance with a first signal constellation, and a data carrier that has been modulated in accordance with a second signal constellation that is in a predetermined relationship with the first signal constellation.

Also, the signal decision method of the present invention is a signal decision method for deciding a type of a received signal that is constituted from a plurality of subcarriers frequency division multiplexed with each other, including: a subcarrier separation step of separating the received signal into the plurality of subcarriers, including a pilot carrier and a data carrier; and a type decision step of deciding, according to a relationship between the pilot carrier and the data carrier obtained as a result of the separation performed in the subcarrier separation step, whether the received signal is a predetermined type of frequency-multiplexed signal including a pilot carrier that has been modulated in accordance with a first signal constellation, and a data carrier that has been modulated in accordance with a second signal constellation that is in a predetermined relationship with the first signal constellation.

Effects of the Invention

According to the above-described signal decision apparatus and signal decision method respectively, a decision is made based on a relationship between a pilot carrier and a data carrier as to whether a received signal is a predetermined type of signal. Thus, since performing equalization processing, demapping processing, and comparing processing on the pilot carriers are not necessary for deciding the type of received signal, the above-described signal decision apparatus and signal decision method enables deciding the type of received signal in a short period, respectively.

In the above-described signal decision apparatus, each of the first signal constellation and the second signal constellation may include two respective signal points on an IQ plane, and the predetermined relationship may be that a straight line connecting the two signal points in the first signal constellation is orthogonal to a straight line connecting the two signal points in the second signal constellation.

In the above-described signal decision apparatus, the two signal points in the first signal constellation may be on a Q axis, and the two signal points in the second signal constellation may be on an I axis.

This structure enables easily including the signal decision apparatus in a reception apparatus that is compliant with the IEEE 802.11n standard.

In the above-described signal decision apparatus, the type decision unit may include a phase difference information detection subunit operable to detect, according to the pilot carrier and the data carrier, phase difference information pertaining to a phase difference between the pilot carrier and the data carrier, and a decision subunit operable to decide whether the received signal is the predetermined type of frequency-multiplexed signal by deciding whether the phase difference information detected by the phase difference information detection subunit fulfills a predetermined phase difference condition that is determined based on a predetermined phase difference range that is fulfilled by a phase difference between the pilot carrier and the data carrier of the predetermined type of frequency-multiplexed signal at a time of signal reception.

Since phase difference information indicating the phase difference between the pilot carrier and the data carrier is used to express the relationship between the pilot carrier and the data carrier, this structure enables deciding the type of received signal in a short period using a simple structure.

In the above-described signal decision apparatus, there may be a plurality of data carriers, of which two may be adjacent to the pilot carrier, and the phase difference information detection subunit may use the pilot carrier and at least one of the two data carriers that are adjacent to the pilot carrier for the detection of the phase difference information.

Differences in frequency characteristics of channels between adjacent subcarriers are usually slight.

By using the pilot carrier and at least one of the two data carriers adjacent to the pilot carrier for detection of the phase difference information, this structure enables detecting phase difference information when there is a slight difference in the phase difference information pertaining to the phases of the pilot carrier and the at least one of the two data carriers at the time of transmission.

Accordingly, the above-described signal decision apparatus enables high-precision decision of the type of received signal.

In the above-described signal decision apparatus, there may be a plurality of pilot carriers, if a number of pilot carriers is N, N being an integer greater than or equal to 2, the phase difference information detection subunit may detect the phase difference information for each of M pilot carriers, M being an integer between 2 and N inclusive, and the decision subunit may perform the decision of whether the received signal is the predetermined type of frequency-multiplexed signal in accordance with the phase difference information of the M pilot carriers detected by the phase difference information detection subunit.

Since phase difference information of a plurality of pilot carriers is used for deciding the type of received signal, according to this structure, there are cases in which the type of received signal can be decided accurately even when a portion of the phase difference information cannot be accurately detected, and this is expected to improve the precision of deciding the type of received signal.

In the above-described signal decision apparatus, there may be a plurality of data carriers, of which two may be adjacent to each of the M pilot carriers, and the phase difference information detection subunit may use each of the M pilot carriers and at least one of the two data carriers that are adjacent to each of the M pilot carriers for the detection of the phase difference information.

Differences in frequency characteristics of channels between adjacent subcarriers are usually slight.

By using the pilot carrier and at least one of the two data carriers adjacent to the pilot carrier for detection of the phase difference information, this structure enables detecting phase difference information when there is a slight difference in the phase difference information pertaining to the phases of the pilot carrier and the at least one of the two data carriers at the time of transmission.

Accordingly, the above-described signal decision apparatus enables high-precision decision of the type of received signal.

In the above-described signal decision apparatus, there may be a plurality of pilot carriers, if a number of pilot carriers is N, N being an integer greater than or equal to 2, the phase difference information detection subunit may detect the phase difference information with respect to one of the N pilot carriers, and the decision subunit may perform the decision of whether the received signal is the predetermined type of frequency-multiplexed signal in accordance with the phase difference information.

According to this structure, the processing load pertaining to deciding the type of received signal is suppressed, since phase difference information is detected for only one pilot carrier, and the decision of the type of received signal is performed in accordance with the phase difference information.

The above-described signal decision apparatus may further include a read control unit operable to read first, from the subcarrier separation unit, the pilot carrier and the data carrier used by the type decision unit for the decision.

According to this structure, since the pilot carrier and the data carrier used by the type decision unit for the decision are read first from the subcarrier separation unit, the decision of the type of received signal can be completed in a shorter period.

BRIEF DESCRIPTION OF THE DRAWINGS

FIGS. 1A and 1B show an exemplary IEEE 802.11n standard frame format used in an embodiment of the present invention;

Figure 2:
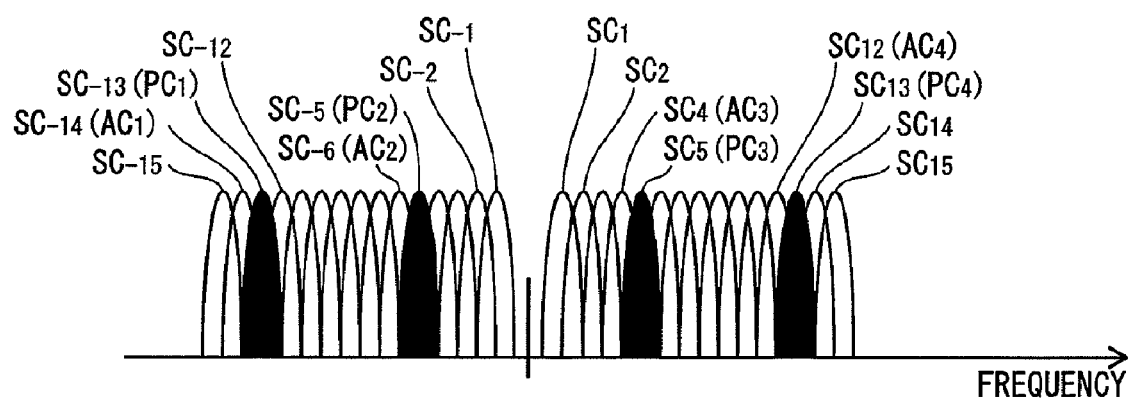
FIG. 2 shows exemplary power spectrums of an SIG, an HTSIG, and a DATA of FIG. 1.

DESCRIPTION OF THE CHARACTERS 100 wireless communication device
110 antenna
120 GCA unit
130 frequency conversion unit
140 AGC unit
150 AFC unit
160 timing detection unit
170 FFT unit
180 read control unit
190 type decision unit
191 pilot carrier extraction unit
192 adjacent carrier extraction unit
193 phase difference detection unit
194 decision unit
200 equalization unit
210 demap unit

BEST MODE FOR CARRYING OUT THE INVENTION

The following describes, with reference to the drawings, a wireless communication device that fulfills functions of a signal decision apparatus pertaining to an embodiment of the present invention.

The description in the present embodiment focuses on two frame formats that are necessary in the 11n standard. Note that one frame format is a frame format of a legacy mode (for a pre-existing 11a terminal) The other frame format is a frame format for a mixed mode (a mode in which an 11a terminal and an 11n terminal coexist).

Frame Formats

The following describes, with reference to FIGS. 1A and 1B, the 11n standard frame formats used for wireless communication by the wireless communication device of the present embodiment. FIGS. 1A and 1B show an exemplary IEEE 802.11n standard frame format used in the present embodiment.

Frame Format of Legacy Mode

The frame format shown in FIG. 1A is the frame format of the legacy mode (11a format).

An 11a format 10 includes an STS storage field 11, an LTS storage field 12, an SIG storage field 13, and a DATA storage field 14.

An STS is used for signal detection, automatic gain control, rough adjustment of carrier frequency errors, symbol timing detection, etc.

An LTS is used for fine adjustment of carrier frequency errors, estimation of channel characteristics (estimation of reference amplitudes and reference phases), etc.

An SIG includes control information indicating packet length, transmission speed, etc. The modulation methods and code rates of DATA are determined according to the transmission speed included in the control information. Note that the modulation methods of DATA are BPSK (Binary Phase Shift Keying), QPSK (Quadrature Phase Shift Keying), 16 QAM (Quadrature Amplitude Modulation), and 64 QAM (Quadrature Amplitude Modulation).

A DATA is a symbol pertaining to transmitted data.

Frame Format of Mixed Mode

The frame format shown in FIG. 1B is the frame format of the mixed mode (11n format).

An 11n format 20 includes an STS storage field 21, an LTS storage field 22, and a SIG storage field 23 for the 11a terminal. In the 11n format, a transmission speed value included in control information in a SIG is a transmission speed value whose modulation method is BPSK, and whose code rate corresponds to ½.

The 11n format 20 includes an HTSIG storage field 24, an HTSTS storage field 25, an HTLTS storage field 26, and a DATA storage field 27 for the 11n terminal.

An HTSIG includes control information such as numbers of MIMO-multiplexed streams, packet lengths, transmission speeds, etc.

An HTSTS is used for automatic gain control, rough adjustment of carrier frequency errors, and symbol timing detection, etc.

An HTLTS is used for fine adjustment of carrier frequency errors, estimating channel characteristics, etc.

Note that in the portions including and subsequent to the HTSTS, high-speed performance has been achieved by MIMO multiplexing and channel bonding, and although the 11n terminal can demodulate the portions including and subsequent to the HTSTS, the 11a terminal cannot demodulate the portions including and subsequent to the HTSTS. However, upon receiving an 11n format signal, the 11a terminal begins demodulation by detecting an STS and an LTS, and the 11a terminal can specify a packet length by demodulating the SIG. Therefore, even though the 11a terminal cannot demodulate the portions including and subsequent to the HTSTS, the 11a terminal can perform processing on the portions including and subsequent to the HTSTS as signals in which a demodulation error has occurred. In this way, the communication protocol of the 11a standard and the communication protocol of the 11n standard were made as communication protocols that can be mutually coexistent.

SIG, HTSIG and DATA

After describing an overview of the subcarriers of SIG, HTSIG and DATA, the details of a signal constellation assigned to the subcarriers of SIG, HTSIG and DATA will be described.

Overview of Subcarriers

FIG. 2 shows exemplary power spectrums of the SIG, the HTSIG, and the DATA of FIG. 1.

For convenience, the number of subcarriers of SIG, HTSIG and DATA are described as being 30 in the present embodiment. Note that the actual number of subcarriers of SIG and DATA in the 11a format and subcarriers of SIG and DATA, etc. in the 11n format is 52.

Also, to facilitate discrimination of the subcarriers, subcarrier numbers $SC_{-15}$, $SC_{-14}$, $SC_{-13}$, ..., $SC_{-2}$, $SC_{-1}$, $SC_1$, $SC_2$, ..., $SC_{13}$, $SC_{14}$, $SC_{15}$, in ascending order of frequency, have been assigned to the subcarriers.

An amplitude and a phase that are known on the receiving end are assigned on the transmitting end to subcarriers having subcarrier numbers that are known on the receiving end, from among the plurality of subcarriers of SIG, HTSIG and DATA. The subcarriers to which the known amplitude and known phase have been assigned are called "pilot carriers".

In the present embodiment, the subcarriers $SC_{-13}$, $SC_{-5}$, $SC_5$, and $SC_{13}$ have been selected as the pilot carriers, and the pilot carrier numbers $PC_1$, $PC_2$, $PC_3$ and $PC_4$, in ascending order of frequency, have been assigned to these pilot carriers. Note that since the number of pilot carriers included in SIGs, etc. in the 11a standard and the 11n standard is 4, the number of pilot carriers in the present embodiment is 4.

An amplitude and a phase are assigned on the transmission end to the subcarriers other than the pilot carriers $PC_1$ to $PC_4$ according to the transmission data. The subcarriers to which the amplitude and the phase have been assigned according to the transmission data are called "data carriers".

In the present embodiment, in particular, subcarriers $SC_{-14}$, $SC_{-6}$, $SC_4$ and $SC_{12}$ that are data carriers having lower frequencies among the data carriers adjacent to the pilot carriers $PC_1$, $PC_2$, $PC_3$ and $PC_4$ are called "adjacent carriers". In ascending order of frequency, adjacent carrier numbers $AC_1$, $AC_2$, $AC_3$, and $AC_4$ are attached to the adjacent carriers.

Signal Constellation

The following describes the signal constellation of the SIG, the HTSIG, and the DATA with reference to FIGS. 3A, 3B, 4A, 4B, and 4C. FIGS. 3A, 3B, 4A, 4B, and 4C show signal constellations on an IQ plane, and in each of the drawings, the horizontal axis is an I axis pertaining to an in phase component, and the vertical axis is a Q axis pertaining to a quadrature component. Note that values of signal points are described using notations in the following format (I axis value, Q axis value).

Figure 3A:
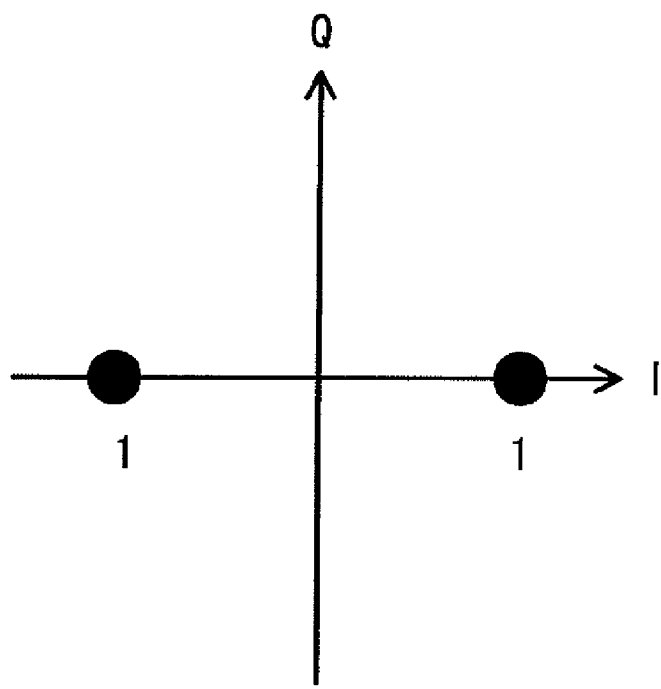
FIGS. 3A and 3B illustrate signal constellations of the SIG, the HTSIG and the DATA of FIG. 1.

The signal points in the signal constellation shown in FIG. 3A are (+1,0) and (−1,0).

Figure 3B:
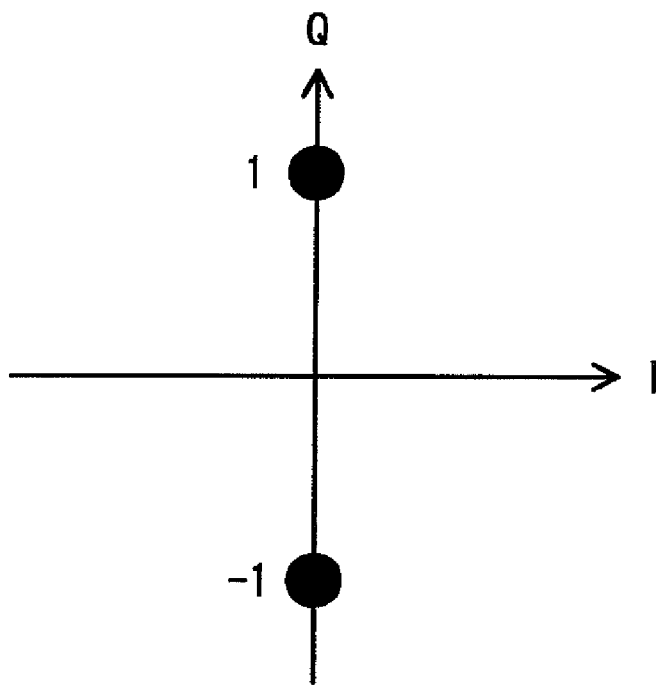

The signal constellation shown in FIG. 3B is compliant with π/2 BPSK, and the signal points are (0,+1) and (0,−1).

Figure 4A:
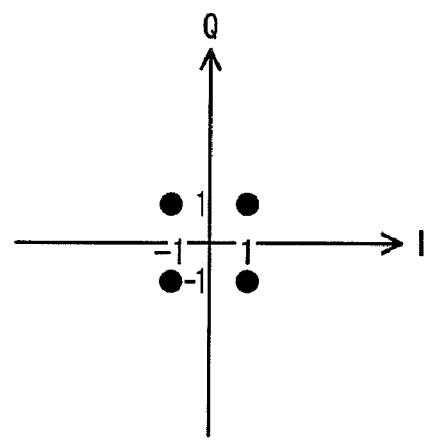
FIGS. 4A, 4B and 4C illustrate signal constellations of the DATA of FIG. 1.
Figure 4B:
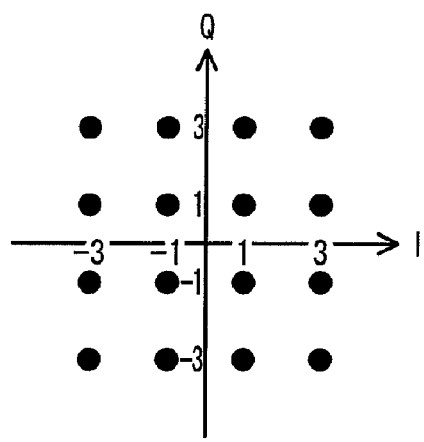
Figure 4C:
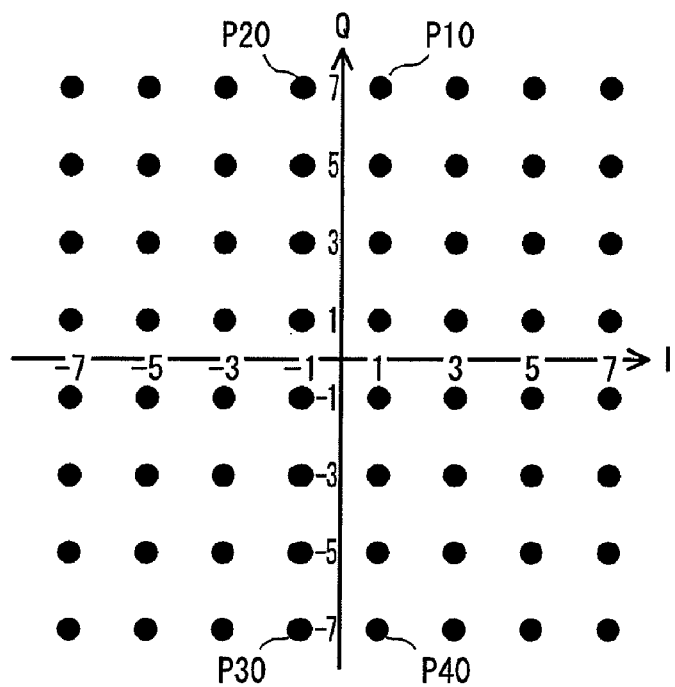

The signal constellation shown in FIG. 4A is compliant with QPSK, the signal constellation shown in FIG. 4B is compliant with 16 QAM, and the signal constellation shown in FIG. 4C is compliant with 64 QAM.

Signal Constellation of SIG

In the SIG, the signal constellation of FIG. 3A is used for assigning amplitudes and phases to both pilot carriers and data carriers, without distinguishing between pilot carriers and data carriers.

Note that for example, signal points (+1,0), (+1,0), (+1,0) and (−1,0) are assigned to the four pilot carriers $PC_1$, $PC_2$, $PC_3$ and $PC_4$ in the SIG.

Signal Constellation of HTSIG

In the HTSIG, the signal constellation of FIG. 3A is used for assigning amplitudes and phases to pilot carriers, and the signal constellation of FIG. 3B is used for assigning amplitudes and phases to data carriers.

Signal Constellation of DATA

In the DATA, the signal constellation of FIG. 3A is used for assigning amplitudes and phases to pilot carriers.

In the DATA when the modulation method is BPSK, the signal constellation of FIG. 3A is used for assigning amplitudes and phases to data carriers. In the DATA when the modulation method is QPSK, the signal constellation of FIG. 4A is used for assigning amplitudes and phases to data carriers. In the DATA when the modulation method is 16 QAM, the signal constellation of FIG. 4B is used for assigning amplitudes and phases to data carriers. In the DATA when the modulation method is 64 QAM, the signal constellation of FIG. 4C is used for assigning amplitudes and phases to data carriers.

Closing Remarks on Signal Constellation

In the case of any of the SIG, the HTSIG, and the DATA, the same signal constellation, that is, the signal constellation shown in FIG. 3A, is used for modulating pilot carriers.

For modulating data carriers in the HTSIG, the signal constellation shown in FIG. 3B, in which the signal points are only arranged on the Q axis, is used.

In contrast, in the SIG and in the DATA when the modulation method is BPSK, the signal constellation of FIG. 3A, in which signal points are not arranged on the Q axis, is used for modulating the data carriers. Also, in DATA when the modulation method is QPSK, 16 QAM, or 64 QAM, the signal constellations shown in FIGS. 4A, 4B, and 4C, in which signal points are not arranged on the Q axis, are used for modulating the data carriers.

Overview of Phase Differences Between Pilot Carriers and Data Carriers

For convenience of description, phase differences are expressed as values greater than or equal to 0° and less than 360°.

In the case of the HTSIG, since the signal constellation of FIG. 3A is used for the modulation of the pilot carriers and the signal constellation of FIG. 3B is used for the modulation of the data carriers, the phase difference between any pilot carrier and any data carrier at the time of modulation is either 90° or 270°.

In the case of the SIG, since the signal constellation of FIG. 3A is used for modulating both the pilot carriers and the data carriers, the phase difference between any pilot carrier and any data carrier at the time of modulation is either 0° or 180°.

In the case of DATA when the modulation method is BPSK, since the signal constellation of FIG. 3A is used for modulating both the pilot carriers and the data carriers, the phase difference between any pilot carrier and any data carrier at the time of modulation is either 0° or 180°.

Also, in the case of DATA when the modulation method is QPSK, 16 QAM or 64 QAM, the signal constellation of FIG. 3A is used for modulating the pilot carriers, and the signal constellations of FIGS. 4A, 4B, and 4C, in which signal points are not arranged on the Q axis, are used for modulating the data carriers. Therefore, the phase difference between any pilot carrier and any data carrier at the time of modulation cannot be either 90° or 270°.

As shown clearly by the above description, phase differences between pilot carriers and data carriers in the HTSIG at the time of modulation are never identical to phase differences between the pilot carriers and data carriers of the SIG and the DATA at the time of modulation.

Accordingly, detecting a phase difference between a pilot carrier and a data carrier and using the detected phase difference enables deciding whether the type of symbol is a HTSIG, or another type of symbol (SIG or DATA).

The wireless communication device described below uses a phase difference between a pilot carrier and a data carrier as a relationship to be used for deciding a type of symbol between the pilot carrier and the data carrier, and decides whether the symbol is an HTSIG in accordance with the phase difference between the pilot carrier and the data carrier.

Note that for convenience, in the description of deciding the type of symbol, HTSIG is referred to as a "first type symbol" and a symbol of a type other than HTSIG (SIG or DATA) is referred to as a "second type symbol".

Structure of Wireless Communication Device

Figure 5:
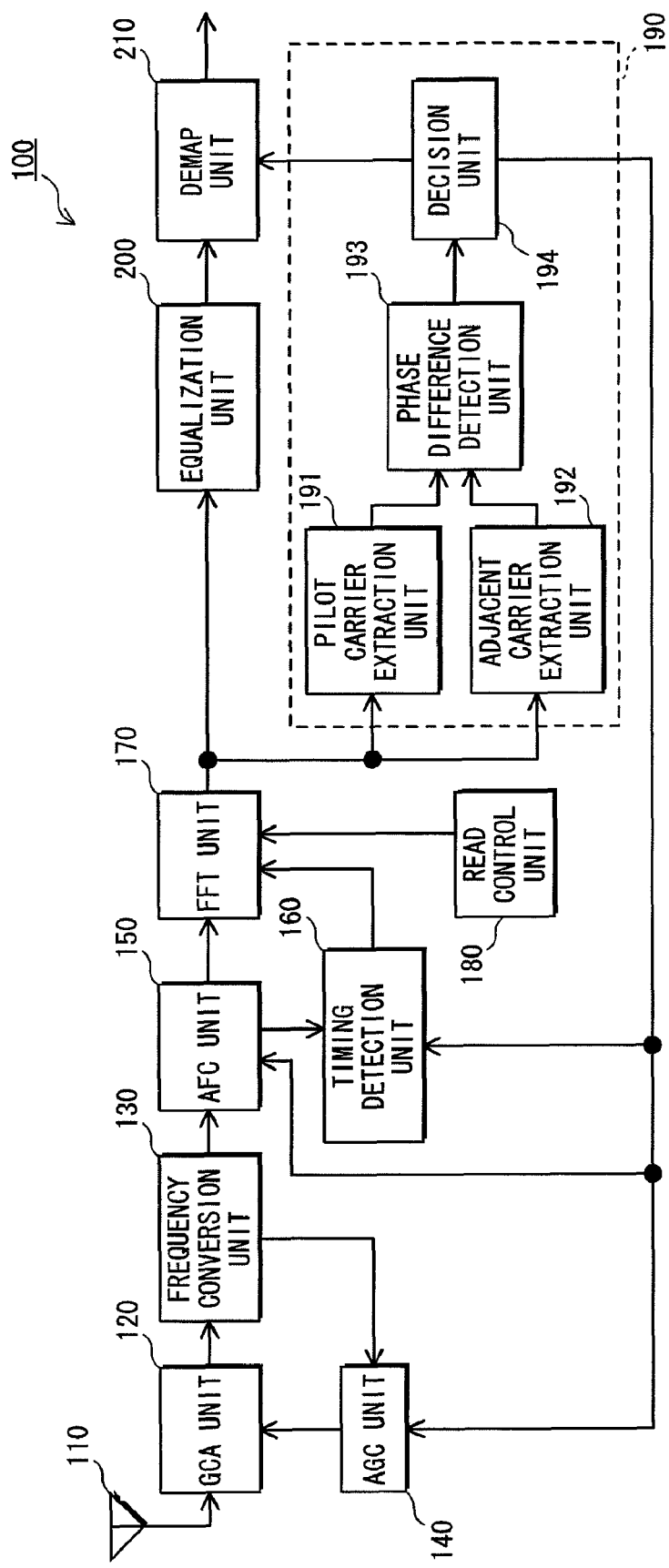
FIG. 5 shows the apparatus structure of the wireless communication device of the embodiment of the present invention.

The following describes the structure of the wireless communication device with reference to FIG. 5. FIG. 5 shows the apparatus structure of the wireless communication device of the embodiment of the present invention.

A wireless communication device 100 includes an antenna 110, a GCA (Gain Control Amp) unit 120, a frequency conversion unit 130, an AGC (Auto Gain Control) unit 140, an AFC (Auto Frequency Control) unit 150, a timing detection unit 160, an FFT unit 170, a read control unit 180, a type decision unit 190, an equalization unit 200, and a demap unit 210.

GCA Unit 120

The GCA unit 120 is gain controlled by the AGC unit 140, amplifies an OFDM signal received via the antenna 110 according to the gain, and outputs the amplified OFDM signal to the frequency conversion unit 130.

Frequency Conversion Unit 130

The frequency conversion unit 130 converts the amplified OFDM signal input from the GCA unit 120 to an OFDM signal having a frequency band appropriate for signal processing, and outputs the OFDM signal obtained by the conversion to the AFC unit 150. IF (Intermediate Frequency) band and base band are examples of frequency bands that are appropriate for signal processing.

AGC Unit 140

The AGC unit 140 controls the gain of the GCA unit 120 according to an STS or an HTSTS included in the OFDM signal output from the frequency conversion unit 130.

AFC Unit 150

The AFC Unit 150 performs rough adjustment of carrier frequency errors according to the STS or HTSTS included in the OFDM signal output from the frequency conversion unit 130.

Also, the AFC unit 150 performs fine adjustment of the carrier frequency errors according to an LTS or HTLTS included in the OFDM signal output from the frequency conversion unit 130.

Timing Detection Unit 160

The timing detection unit 160 detects a symbol timing (a timing at which the FFT unit 170 performs Fourier conversion) in accordance with the STS or the HTSTS included in the OFDM signal on which the AFC unit 150 has performed rough adjustment of the carrier frequency errors. The timing detection unit 160 outputs the detected symbol timing to the FFT unit 170.

FFT Unit 170

The FFT unit 170, in accordance with the symbol timing detected by the symbol detection unit 160, separates the OFDM symbol input from the AFC unit 150 into a plurality of subcarriers by Fourier conversion in units of one symbol.

The symbols converted by Fourier conversion by the FFT unit 170 are the LTS, the HTLTS, the SIG, the HTSIG, and the DATA.

Read Control Unit 180

For convenience in the following description, a symbol on which read control is performed by the read control unit 180 is referred to as a "read symbol". Also, for convenience, the LTS and the HTLTS are referred to as "training symbols", and the SIG, the HTSIG and the DATA are referred to as "information symbols".

The read control unit 180 controls the order of reading, from the FFT unit 170, a plurality of carriers obtained as a result of the Fourier conversion by the FFT unit 170, according to the types (training symbol and information symbol) of read symbol converted by Fourier conversion by the FFT unit 170.

Note that transmission data is mapped on the transmission end in the order of subcarrier $SC_{-15}$, subcarrier $SC_{-14}$, ... subcarrier $SC_{14}$, and subcarrier $SC_{15}$.

Read Control of Subcarriers Pertaining to LTS and HTLTS

When the read symbol is a training symbol (LTS or HTLTS), the read control unit 180 reads the subcarriers from the FFT unit 170 in ascending order of frequency.

Figure 6:
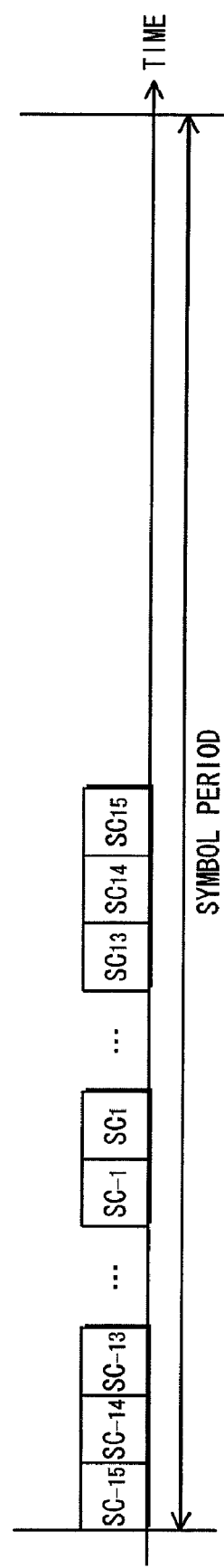
FIG. 6 illustrates read control of subcarriers pertaining to training symbols performed by a read control unit of FIG. 5.

Specifically, as shown in FIG. 6, the read control unit 180 reads the plurality of subcarriers in the order of subcarrier $SC_{-15}$, subcarrier $SC_{-14}$, ... subcarrier $SC_{14}$, and subcarrier $SC_{15}$.

The following describes the reason for performing the reading of the plurality of subcarriers as described above when the read symbol is a training symbol.

Since differences in frequency characteristics of channels between adjacent subcarriers are slight, performing filter processing on the plurality of subcarriers in ascending order of frequency enables reducing measurement errors in the frequency characteristics.

Also, reading the plurality of subcarriers in increasing order of frequency enables easily performing filter processing on the plurality of subcarriers in a frequency direction.

In view of this, when the read symbol is the training symbol used for estimating the channel characteristic, the reading of the plurality of subcarriers from the FFT unit 170 is performed in ascending order of frequency so that filter processing can easily be performed in the frequency direction.

The read control unit 180 may instead be caused to read the subcarriers from the FFT unit 170 in descending order of frequency, and in this case also, filter processing can easily be performed in the frequency direction.

Note that there is not necessarily a need for the read control unit 180 to read the plurality of subcarriers in ascending order or descending order of frequency.

Read Control of Subcarriers Pertaining to SIG, HTSIG, and DATA

When the read symbol is an information symbol (SIG, HTSIG, or DATA), the read control unit 180 reads the plurality of subcarriers from the FFT unit 170 in the following manner.

The read control unit 180 first reads all of the pilot carriers from the FFT unit 170, reads all of the adjacent carriers, and then, after leaving a predetermined interval, reads the subcarriers (including the pilot carriers and the adjacent carriers) in ascending order of frequency.

Figure 7:
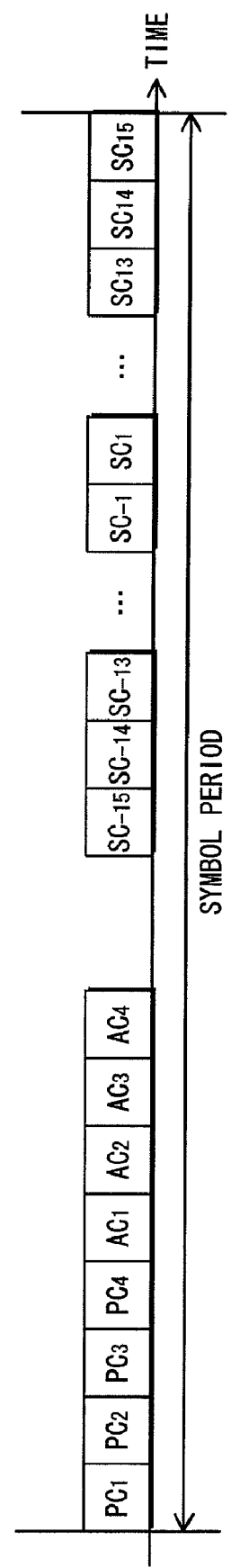
FIG. 7 illustrates read control of subcarriers pertaining to information symbols performed by the read control unit of FIG. 5.

Specifically, as shown in FIG. 7, the read control unit 180 first reads the four pilot carriers $PC_1$ to $PC_4$ from the FFT unit 170 in ascending order of frequency.

After completing reading all of the pilot carriers $PC_1$ to $PC_4$, the read control unit 180 reads the four adjacent carriers $AC_1$ to $AC_4$ from the FFT unit 170 in ascending order of frequency.

After completing reading all of the adjacent carriers $AC_1$ to $AC_4$, the read control unit 180 leaves a predetermined interval after reading the adjacent carrier $AC_4$, and reads the subcarriers $SC_{-15}$ to $SC_{15}$ from the FFT unit 170 in ascending order of frequency.

The predetermined interval is determined according to an amount of time needed by the type decision unit 190 for deciding the type of information symbol, and according to a symbol interval, which are described later. For example, the predetermined interval may be determined by adding a margin of a predetermined amount to the time needed by the type decision unit 190 for deciding the type of information symbol.

The following describes the reason for reading the pilot carriers, etc. in the manner described above when the read symbol is an information symbol.

As described later, the pilot carriers $PC_1$ to $PC_4$ and the adjacent carriers $AC_1$ to $AC_4$ are used for the processing, performed by the type decision unit 190, for deciding the type of information symbol.

Also, for example, to effectively utilize the HTSTS following the HTSIG for automatic gain control, etc., it is preferable to end the processing for deciding the type of information symbol and to be able to specify that the information signal is HTSIG as early as possible after performing Fourier conversion on the information symbol.

In view of this, the read control unit 180 first reads the pilot carriers $PC_1$ to $PC_4$ and the adjacent carriers $AC_1$ to $AC_4$ from the FFT unit 170, so that the processing for deciding the type of information symbol can begin early and be completed early.

Type Decision Unit 190

The type decision unit 190 performs processing for deciding the type of information symbol with use of the pilot carriers $PC_1$ to $PC_4$ and the adjacent carriers $AC_1$ to $AC_4$ that constitute the information symbol.

The type decision unit 190 includes a pilot carrier extraction unit 191, an adjacent carrier extraction unit 192, a phase difference detection unit 193, and a decision unit 194.

Pilot Carrier Extraction Unit 191

The pilot carrier extraction unit 191, when the read symbol is an information symbol, extracts the pilot carriers $PC_1$ to $PC_4$ from the output carriers output from the FFT unit 170 in the read control by the read control unit 180, and stores the extracted pilot carriers $PC_1$ to $PC_4$.

Adjacent Carrier Extraction Unit 192

The adjacent carrier extraction unit 192, when the read symbol is an information symbol, extracts the adjacent carriers $AC_1$ to $AC_4$ from the output carriers output from the FFT unit 170 in the read control by the read control unit 180, and stores the extracted adjacent carriers $AC_1$ to $AC_4$.

Phase Difference Detection Unit 193

The phase difference detection unit 193 acquires the pilot carrier $PC_1$ from the pilot carrier extraction unit 191, and acquires the adjacent carrier $AC_1$ from the adjacent carrier extraction unit 192. Then, the phase difference detection unit 193 detects a phase difference $\Delta\theta_1$ between the pilot carrier $PC_1$ and the adjacent carrier $AC_1$, and outputs the detected phase difference $\Delta\theta_1$ to the decision unit 194.

The phase difference detection unit 193 acquires the pilot carrier $PC_2$ from the pilot carrier extraction unit 191, and acquires the adjacent carrier $AC_2$ from the adjacent carrier extraction unit 192. Then, the phase difference detection unit 193 detects a phase difference $\Delta\theta_2$ between the pilot carrier $PC_2$ and the adjacent carrier $AC_2$, and outputs the detected phase difference $\Delta\theta_2$ to the decision unit 194.

The phase difference detection unit 193 acquires the pilot carrier $PC_3$ from the pilot carrier extraction unit 191, and acquires the adjacent carrier $AC_3$ from the adjacent carrier extraction unit 192. Then, the phase difference detection unit 193 detects a phase difference $\Delta\theta_3$ between the pilot carrier $PC_3$ and the adjacent carrier $AC_3$, and outputs the detected phase difference $\Delta\theta_3$ to the decision unit 194.

The phase difference detection unit 193 acquires the pilot carrier $PC_4$ from the pilot carrier extraction unit 191, and acquires the adjacent carrier $AC_4$ from the adjacent carrier extraction unit 192. Then, the phase difference detection unit 193 detects a phase difference $\Delta\theta_4$ between the pilot carrier $PC_4$ and the adjacent carrier $AC_4$, and outputs the detected phase difference $\Delta\theta_4$ to the decision unit 194.

Here is a description of exemplary processing for detecting the phase difference performed by the phase difference detection unit 193.

The phase difference detection unit 193 multiplies complex conjugates of the adjacent carrier and the pilot carrier, and divides an imaginary part (Y) of the multiplied value obtained as a result of the multiplication by a real part (X) of the multiplied value. The phase difference detection unit 193 calculates an arc tangent of the divided values (Y/X) obtained as a result of this division. The value (arctan (Y/X)) obtained as a result of this operation is the phase difference between the pilot carrier and the adjacent carrier.

The reason for using the pilot carrier and the adjacent carrier that is adjacent to the adjacent carrier for detecting the phase difference is as follows.

Differences in frequency characteristics of channels between adjacent subcarriers are slight. For this reason, the phase difference between the pilot carrier and the adjacent carrier at the time of reception is dominant over the phase difference between the pilot carrier and the adjacent carrier at the time of transmission, and even if the pilot carrier and the adjacent carrier have been influenced by the channel, the difference between the phase difference at the time of reception and the phase difference at the time of transmission is considered to be slight. In view of this, the pilot carrier and the adjacent carrier that is adjacent to the pilot carrier are used.

Decision Unit 194

The decision unit 194 decides whether the information symbol is a first type symbol (HTSIG) or a second type symbol (SIG or DATA) in accordance with the phase differences $\Delta\theta_1$, $\Delta\theta_2$, $\Delta\theta_3$, and $\Delta\theta_4$.

Specifically, the decision unit 194 decides whether each of the phase differences $\Delta\theta_1$, $\Delta\theta_2$, $\Delta\theta_3$, and $\Delta\theta_4$ fulfill the phase difference condition. The phase difference condition is a predetermined condition based on a range of phase differences determined in advance that is fulfilled by a phase difference between a pilot carrier and a data carrier of the first type symbol at the time of reception. Note that an example of the phase difference condition is described later with reference to FIG. 8.

The decision unit 194 decides that the information symbol is a first type symbol if the number of the phase differences that fulfill the phase difference condition among the phase differences $\Delta\theta_1$ to $\Delta\theta_4$ is greater than or equal to a threshold TH (TH being a value that is larger than 0 and less than or equal to 4, for example 2). Then, the decision unit 194 outputs, to the demap unit 210, type information indicating that the information symbol is a first type symbol, and outputs, to the AGC unit 140, the AFC unit 150, and the timing detection unit 160, a readjustment instruction signal as an instruction to perform readjustment.

Meanwhile, the decision unit 194 decides that the information symbol is a second type symbol if the number of the phase differences that fulfill the phase difference condition among the phase differences $\Delta\theta_1$ to $\Delta\theta_4$ is less than the threshold TH, and outputs, to the demap unit 210, type information indicating that the information symbol is a second type symbol.

Example of Phase Difference Condition

Figure 8:
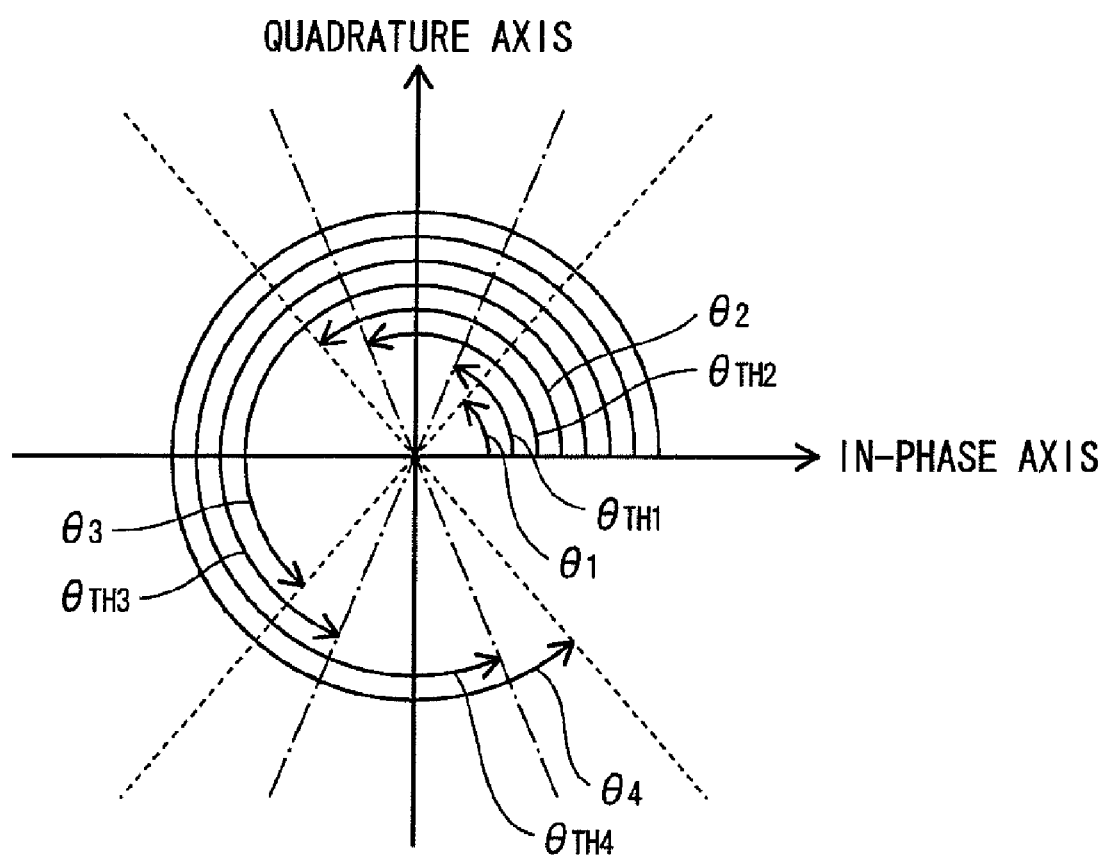
FIG. 8 illustrates a phase difference condition used by the decision unit of FIG. 5.

The following describes, with reference to FIG. 8, an example of a phase difference condition used by the decision unit 194 for processing to decide the type of information symbol. FIG. 8 illustrates the example of the phase difference condition used by the decision unit 194 to decide the type of information symbol. In FIG. 8, the axis in which the phase difference with the pilot carrier is 0° (hereinafter referred to as the "in-phase axis") is expressed on the horizontal axis, and the axis in which the phase difference with the pilot carrier is 90° (hereinafter referred to as the "quadrature axis"), is expressed on the vertical axis.

In the HTSIG at the time of transmission, the phase difference between the pilot carrier and the adjacent carrier is 90° or 270°.

In the following description, a "reference point" refers to a signal point for which, when the absolute value of the value of the Q axis of the symbol point is divided by the absolute value of the value of the I axis of the signal point, the value obtained by the division is greatest, among signal points that possibly have assigned thereto an amplitude and a phase of the data carrier of the second type symbol.

In the present embodiment, the signal points that possibly have assigned thereto the amplitude and the phase of the data carrier of the second type symbol are the signal points shown in FIGS. 3A, 4A, 4B, and 4C, and the reference points in this case are the signal points P10, P20, P30, and P40 shown in FIG. 4C.

The phase differences $\theta_1$, $\theta_2$, $\theta_3$, and $\theta_4$ shown in FIG. 8 indicate phase differences of a pilot carrier having an adjacent carrier to which has been assigned an amplitude and a phase according to any of the signal points P10, P20, P30, or P40. Note that for example, the phase difference between a pilot carrier to which has been assigned the signal point (1,0) and an adjacent carrier to which has been assigned the signal point P10, and the phase difference between a pilot carrier to which has been assigned the signal point (−1,0) and an adjacent carrier to which has been assigned the signal point P30, are the phase difference $\theta_1$.

Thresholds $\theta_{TH1}$, $\theta_{TH2}$, $\theta_{TH3}$, and $\theta_{TH4}$ for the phase differences shown in FIG. 8 are thresholds for deciding whether an information symbol is a first type symbol or a second type symbol.

The threshold $\theta_{TH1}$ is greater than $\theta_1$ and less than or equal to 90°, and the threshold $\theta_{TH2}$ is greater than or equal to 90° and less than $\theta_2$. The threshold $\theta_{TH3}$ is greater than $\theta_3$ and less than or equal to 270°, and the threshold $\theta_{TH4}$ is greater than or equal to 270° and less than $\theta_4$.

For example, $90-\theta_1=2$ ($90-\theta_{TH1}$), $\theta_2-90=2$ ($\theta_{TH2}-90$), $270-\theta_3=2$ ($270-\theta_{TH3}$), and $\theta_4-270=2$ ($\theta_{TH4}-270$).

In the case described above, the phase difference condition is determined to be such that an information symbol is decided to be a first type symbol in cases when the phase difference falls in a phase difference range made up of a first phase difference range, in which the phase difference between the pilot carrier and the adjacent carrier of the information symbol at the time of reception is greater than or equal to the threshold $\theta_{TH1}$ and less than or equal to the threshold $\theta_{TH2}$, and a second phase difference range, in which the phase difference between the pilot carrier and the adjacent carrier of the information symbol at the time of reception is greater than or equal to the threshold $\theta_{TH3}$ and less than or equal to the threshold $\theta_{TH4}$.

Equalization Unit 200

When the read symbol is a training symbol (LTS or HTLTS), for each subcarrier $SC_{-15}$ to $SC_{15}$ read in ascending order of frequency from the FFT unit 170 in the read control by the read control unit 180, the equalization unit 200 estimates a channel characteristic pertaining to the subcarrier. Note that the equalization unit 200 may be caused to estimate the channel characteristic after performing filter processing in the frequency direction on the plurality of subcarriers.

When the read symbol is an information symbol (SIG, HTSIG, or DATA), the equalization unit 200 equalizes, according to the estimation result of the channel characteristic estimated based on the training symbol, each of the subcarriers $SC_{-15}$ to $SC_{15}$ read in ascending order of frequency from the FFT unit 170 in the read control by the read control unit 180. Thus the amplitude and phase of each subcarrier at the time of transmission is regenerated, and the equalization unit 200 outputs the regenerated amplitude and phase to the demap unit 210. Note that the subcarriers $SC_{-15}$ to $SC_{15}$ on which equalization processing is to be performed by the equalization unit 200 are the subcarriers read after leaving the predetermined interval after reading the adjacent carrier $AC_4$ (see FIG. 7)

Demap Unit 210

The demap unit 210 performs demapping of the amplitude and the phase input from the equalization unit 200, according to the known signal constellation, and thus the transmission data is regenerated. Note that error correction processing is performed on the regenerated transmission data by a decoding unit (not depicted) in a later step from the processing of the demap unit 210.

Here, when the type information input from the decision unit 194 indicates the first type symbol, since the target of the demap processing is HTSIG, the demap unit 210 uses the signal constellation of FIG. 3B for demap processing.

In a case that the type information input from the decision unit 194 indicates the second type symbol, (1) when the targeted symbol is the symbol following the LTS and (2) is a symbol following the SIG that includes control information indicating a transmission speed compliant with BPSK, since the target of the demap processing is the SIG, and the DATA has been BPSK modulated, the demap unit 210 uses the signal constellation of FIG. 3A for demap processing.

Note that since the subcarriers $SC_{-15}$ to $SC_{15}$ are read from the FFT unit 170 and input to the demap unit 210 via the equalization unit 200 after the signal constellation has been determined, a buffer, for storing the data carrier until the signal constellation is determined, is unnecessary.

When the targeted symbol is the symbol following the SIG that includes control information indicating a transmission speed compliant with QPSK, 16 QAM, or 64 QAM, the demap unit 210 uses, for demap processing, the signal arrangement of FIGS. 4A, 4B, and 4C determined according to the control information included in the SIG.

Operation of the Wireless Communication Device

Gain Adjustment, Frequency Synchronization and Symbol Synchronization

Figure 9:
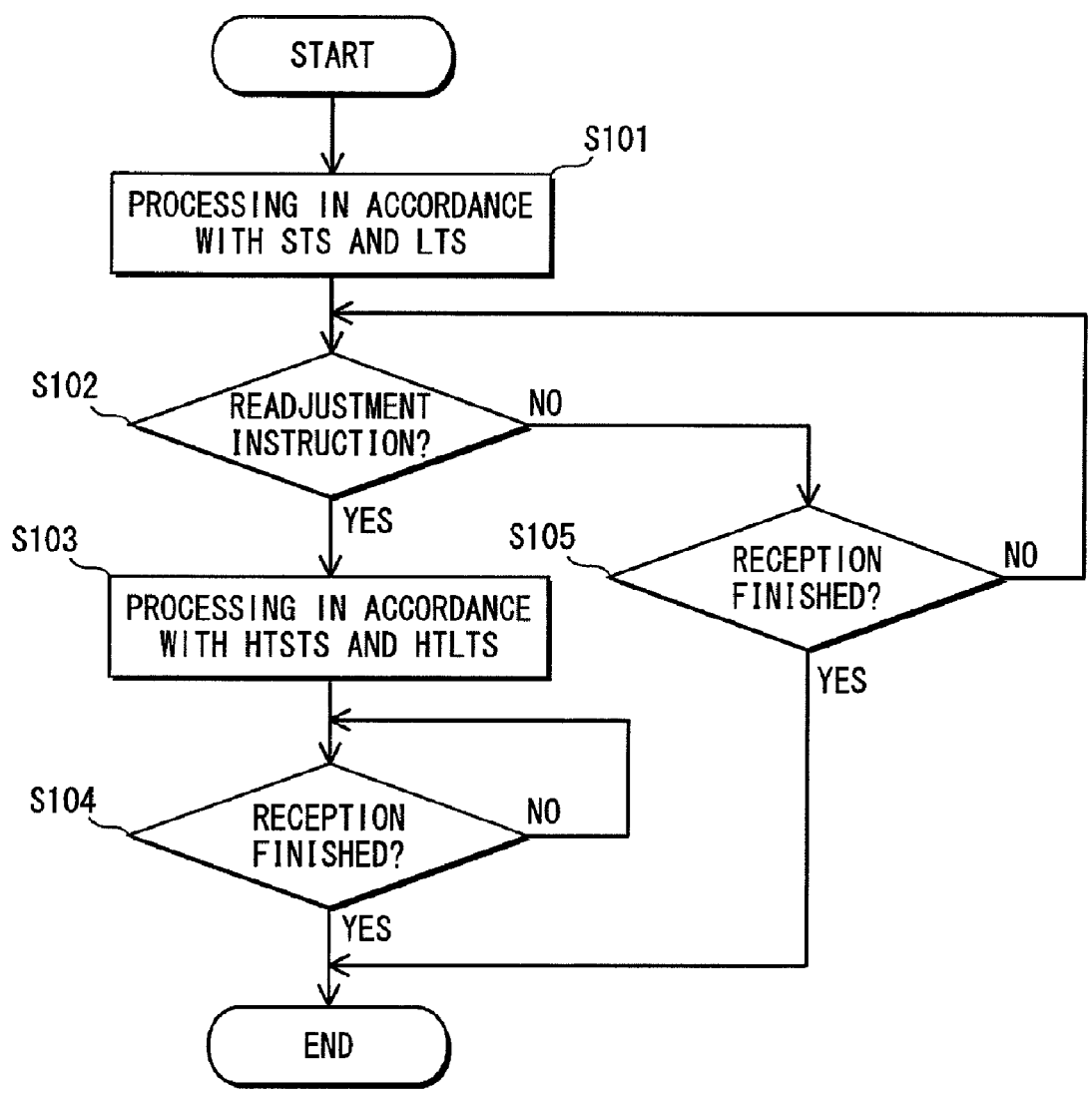
FIG. 9 is a flowchart showing a flow of gain adjustment, frequency synchronization and symbol synchronization performed by the wireless communication device of FIG. 5.

The following describes a flow of gain adjustment, frequency synchronization, and symbol synchronization performed by the wireless communication device of FIG. 5, with reference to FIG. 9. FIG. 9 is a flowchart showing the flow of gain adjustment, frequency synchronization and symbol synchronization performed by the wireless communication device 100 of FIG. 5.

In the wireless communication device 100, gain control of the GCA unit 120 is performed by the AGC unit 140, rough adjustment of carrier frequency errors is performed by the AFC unit 150, and detection of the symbol timing is performed by the timing detection unit 160 in accordance with the STS included in the OFDM signal. Next, in the wireless communication device 100, fine adjustment of carrier frequency errors is performed by the AFC unit 150 in accordance with the LTS included in the OFDM signal (step S101).

The AGC unit 140, the AFC unit 150 and the timing detection unit 160 decide whether the readjustment instruction signal has been input from the decision unit 194 (step S102).

If the readjustment instruction signal has been input (S102: YES), the wireless communication device 100 begins processing according to the HTSTS and the HTLTS. In the wireless communication device 100, gain control of the GCA unit 120 is performed by the AGC unit 140, rough adjustment of carrier frequency errors is performed by the AFC unit 150, and detection of the symbol timing is performed by the timing detection unit 160 in accordance with the HTSTS included in the OFDM signal. Next, in the wireless communication device 100, fine adjustment of carrier frequency errors is performed by the AFC unit 150 in accordance with the HTLTS included in the OFDM signal (step S103).

The wireless communication device 100 decides whether reception of the received signal has finished (step S104). If reception of the received signal has not finished (S104: NO), the processing of S104 is performed. Meanwhile, if the reception of the received signal has finished (S104: YES), the wireless communication device 100 provides for the next signal.

If the readjustment instruction signal has not been input (S102: NO), the wireless communication device 100 decides whether the reception of the received signal has finished (step S105). If the reception of the received signal has not finished (S105: NO), the processing of step S102 is performed. Meanwhile, if reception of the received signal has finished (S105: YES), the wireless communication device 100 provides for the next signal.

Symbol Type Decision and Demodulation

Figure 10:
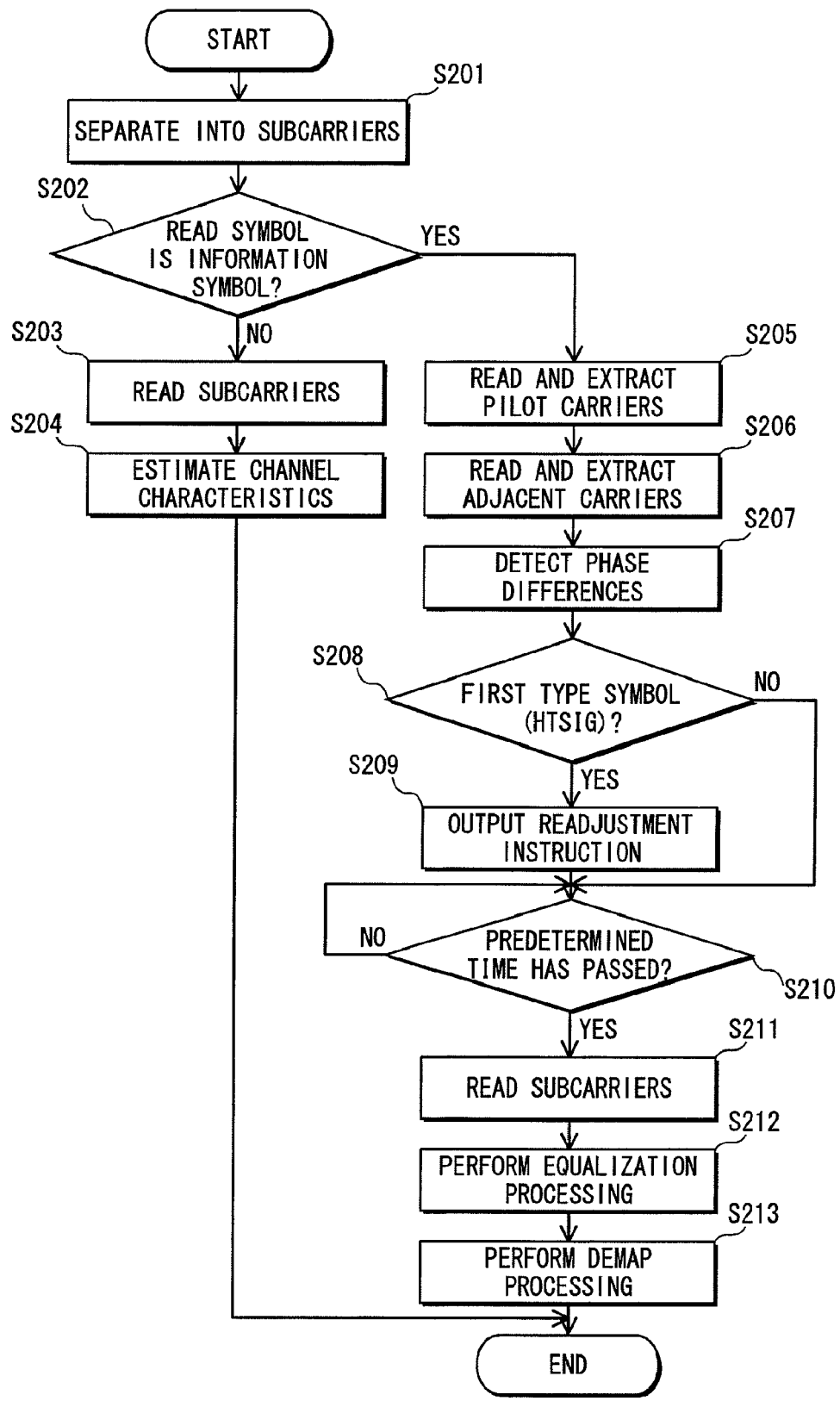
FIG. 10 is a flowchart showing a flow of processing for deciding a type of a symbol and demodulation processing performed by the wireless communication device of FIG. 5.

The following describes the flow of symbol type decision processing and demodulation processing performed by the wireless communication device 100 of FIG. 5 with reference to FIG. 10. FIG. 10 is a flowchart showing the flow of processing for deciding a type of a symbol and demodulation processing performed by the wireless communication device 100 of FIG. 5.

The FFT unit 170 separates an input symbol into a plurality of subcarriers by Fourier conversion (step S201).

The read control unit 180 decides whether the symbol Fourier converted by the FFT unit 170 (the read symbol) is an information symbol (SIG, HTSIG, or DATA) (step S202).

Note that regardless of whether the symbols following SIG (which are either HTSIG or DATA) are 11a format or 11n format, the order of inputting the symbols to the FFT unit 170 is as follows: training symbol (LTS), information symbol (SIG), and information symbol (either HTSIG or DATA). Also, if an HTSTS is not input to the FFT unit 170, or if the symbol following the SIG is an HTSIG, the order in which the symbols are input to the FFT unit 170 following the HTSIG are as follows: training symbol (HTLTS), and information symbol (DATA). With use of this order, the read control unit 180 can decide whether the read symbol is an information symbol.

If the read symbol is not an information symbol, in other words, is a training symbol (LTS or HTLTS) (S202: NO), as shown in the example of FIG. 6, the read control unit 180 reads the subcarriers from the FFT unit 170 in ascending order of frequency (step S203). Then, the equalization unit 200 estimates a channel characteristic for each subcarrier based on the plurality of read subcarriers (step S204). Then the FFT unit 170, etc. performs processing on the next symbol.

If the read symbol is an information symbol (S202: YES), as shown in the example of FIG. 7, the read control unit 180 reads the pilot carriers $PC_1$ to $PC_4$ from the FFT unit 170, and the pilot carrier extraction unit 191 extracts and stores the pilot carriers $PC_1$ to $PC_4$ read from the FFT unit 170 (step S205).

The read control unit 180 reads the adjacent carriers $AC_1$ to $AC_4$ from the FFT unit 170, and the adjacent carrier extraction unit 192 extracts and stores the adjacent carriers $AC_1$ to $AC_4$ read from the FFT unit 170 (step S206).

The phase difference detection unit 193 detects the phase differences $\Delta\theta_1$ to $\Delta\theta_4$ between the pilot carriers $PC_1$ to $PC_4$ stored in the pilot carrier extraction unit 191 and the adjacent carriers $AC_1$ to $AC_4$ stored in the adjacent carrier extraction unit 192 (step S207).

The decision unit 194 decides whether each of the phase differences $\Delta\theta_1$ to $\Delta\theta_4$ detected by the phase difference detection unit 193 fulfills the phase difference condition. Then, the decision unit 194 decides whether the read symbol is the first type symbol (HTSIG) by deciding whether the number of phase differences that fulfill the phase difference condition is greater than or equal to the threshold TH (step S208).

If the number of phase differences that fulfill the phase difference condition is greater than or equal to the threshold TH, the decision unit 194 decides that the read symbol is the first type symbol (S208: YES), the decision unit 194 outputs the readjustment instruction signal to the AGC unit 140, the AFC unit 150, and the timing detection unit 160 (step S209), and next performs step S210. Note that when the information symbol is determined to be HTSIG, the wireless communication device 100 specifies that the OFDM signal being received is an 11n-format signal.

If the number of phase differences that fulfill the phase difference condition is less than the threshold TH, the decision unit 194 decides that the read symbol is the second type symbol (SIG or DATA) (S208: NO), and step S210 is performed.

The read control unit 180 decides whether a predetermined period has passed since reading all of the adjacent carriers $AC_1$ to $AC_4$ (step S210). If the predetermined period has not passed (S210: NO), the processing of step S210 continues to be performed. Meanwhile, if the predetermined time has passed (S210: YES), the read control unit 180 reads the subcarriers $SC_{-15}$ to $SC_{15}$ from the FFT unit 170 (step S211).

The equalization unit 200 performs equalization processing on the subcarriers $SC_{-15}$ to $SC_{15}$ read from the FFT unit 170 (step S212), and the demap unit 210 performs demap processing with use of the amplitude and the phase regenerated from the equalization processing performed by the equalization unit 200 (step S213). Then, the FFT unit 170, etc. provides for performing processing on the next symbol.

Supplementary Remarks

The present invention is not limited to the embodiment described above, and for example, the following variations are also included in the present invention.

(1) Although in the above embodiment, processing for deciding the type of information symbol is performed for all of the information symbols (SIG, HTSIG, and DATA), when the symbol corresponds to the 11a format or the 11n format of FIG. 1A, the processing for deciding the type of information symbol may be performed for only a symbol following the SIG. Also, the processing for deciding the type of information symbol for the symbol following the SIG may be performed only when a transmission speed value in the control information of the SIG is a transmission speed value corresponding to the BPSK. Note that in this case, since the HTSIG is in the first type symbol, and only the DATA that has been BPSK modulated is in the second type symbol, a phase difference range made up of a phase difference range between 45 degrees and 135 degrees inclusive, and a phase difference between 225 degrees and 315 degrees inclusive, for example, can be used as the phase difference condition.

Figure 11:
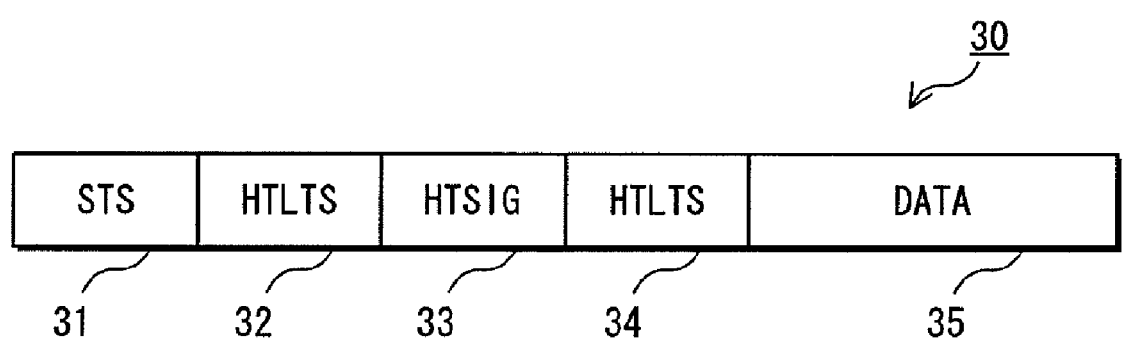
FIG. 11 shows an exemplary other frame format of the IEEE 802.11n standard.
Figure 12:
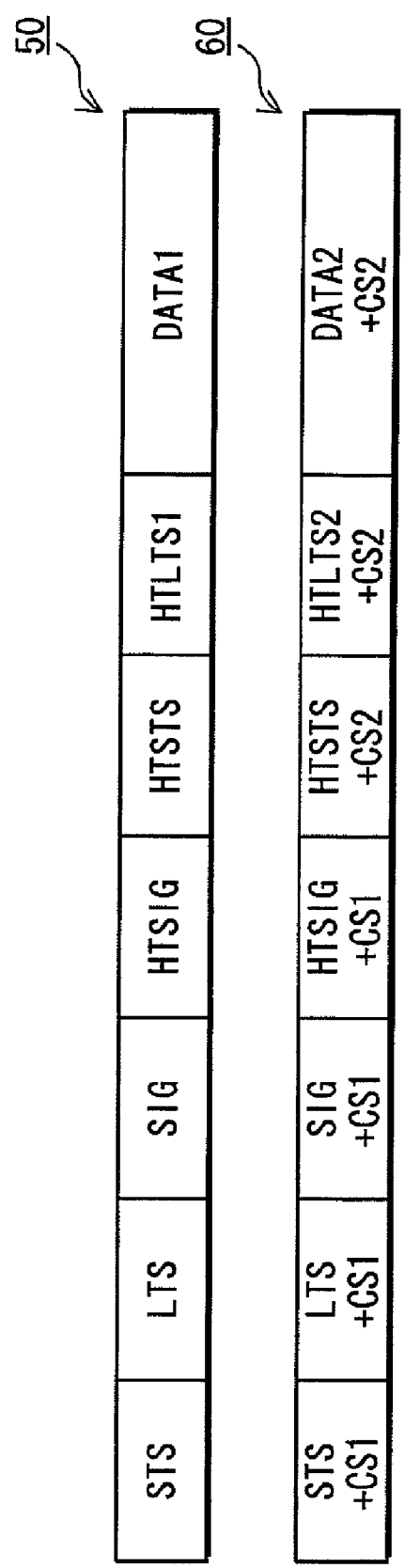
FIG. 12 shows an exemplary frame format transmitted by MIMO multiplexing for illustrating a problem pertaining to the IEEE 802.11n standard.

(2) Although in the above embodiment, the frame format of a signal is either the 11a format shown in FIG. 1A or the 11n format shown in FIG. 1B, the present invention is not limited to this. For example, in addition to the 11a format and the 11n format, a frame format (hereinafter referred to as an "HT format") of a green field mode (a high-efficiency mode for the 11n terminal) shown in FIG. 11 may be used as the frame format of a signal.

An HT format 30 includes an STS storage field 31, an HTLTS storage field 32, an HTSIG storage field 33, an HTLTS storage field 34 and a DATA storage field 35.

Note that when a symbol stored in a storage field following the storage fields 12, 22, and 32 is decided to be a first type symbol (HTSIG) in the processing to decide the type of information symbol, the symbol is decided to be the HT format, and when the symbol is decided to be a symbol other than HTSIG, the symbol is decided to be either 11a format or 11n format.

(3) Although in the above embodiment, a phase difference between the pilot carrier and the adjacent carrier is used as the relationship between the pilot carrier and the adjacent carrier in the processing to decide the type of information symbol, the present invention is not limited to this. A relationship between the pilot carrier and the adjacent carrier other than the phase difference may be used.

For example, an imaginary part of the result of multiplying a complex conjugate of the pilot carrier with the adjacent carrier may be divided by a real part of the result of the multiplication, and the resulting value may be used as the relationship between the pilot carrier and the adjacent carrier. Also, a vector (hereinafter referred to as a "phase difference vector") indicating the phase difference between the pilot carrier and the adjacent carrier may be used. Note that these can be considered as phase difference information pertaining to the phase difference between the pilot carrier and the adjacent carrier.

For example, when only HTSIG is in the first type symbol, and only SIG and DATA modulated by BPSK are in the second type symbol, the phase difference detection unit 193 detects a value (corresponding to a phase difference vector) that is a result of multiplying the adjacent carrier and the complex conjugate of the pilot carrier. In this case, for example, the absolute value of the imaginary part of the result of the multiplication being larger than the absolute value of the real part of the result of the multiplication can be used as the phase difference condition. Then, the decision unit 194 decides that the phase difference vector has fulfilled the phase difference condition when the absolute value of the imaginary part of the result of the multiplication is larger than the absolute value of the real part of the result of the multiplication.

(4) Although in the above embodiment, of the data carriers adjacent to the pilot carrier, the data carrier having a lower frequency is used for the detection, the data carrier used for detecting the phase difference is not limited to this, and for example the following may be used.

Of the data carriers adjacent to the pilot carrier, a data carrier having a higher frequency may be used for the detection, or both adjacent data carriers may be used. When using both data carriers adjacent to the pilot carrier (hereinafter one data carrier is referred to as a "first adjacent carrier", and the other is referred to as a "second adjacent carrier") for detecting the phase difference, for example, the phase difference detection unit 193 detects the phase difference between the pilot carrier and the first adjacent carrier, detects the phase difference between the pilot carrier and the second adjacent carrier, and calculates an average of the two phase differences (hereinafter referred to as an "average phase difference") as a phase difference to use for deciding the type of information symbol. Then, the decision unit 194 may decide whether the average phase difference fulfills the phase difference condition. Alternatively, the phase difference detection unit 193 may obtain an average value of the first adjacent carrier and the second adjacent carrier (hereinafter referred to as a "average adjacent carrier"), and a phase difference between the pilot carrier and the average adjacent carrier may be detected as the phase difference used for deciding the type of information symbol.

Also, a data carrier other than a data carrier adjacent to the pilot carrier may be used for detecting the phase difference.

Furthermore, a plurality of data carriers including at least one of the two data carriers that are adjacent to the pilot carrier may be used for detecting the phase difference, or a plurality of data carriers that do not include the two data carriers that are adjacent to the pilot carrier may be used.

(5) Although in the embodiment, the type decision unit 190 uses all of the four pilot carriers that constitute the information symbol for the processing to decide the type of information symbol, the present invention is not limited to this, and for example, the following may be used.

If the number of pilot carriers included in the information symbol is N (N being an integer greater than or equal to 2), the type decision unit 190 may use M pilot carriers (M being an integer between 2 and N, inclusive) for the processing to decide the type of information symbol. In this case, for example, the phase difference detection unit 193 detects a phase difference between each of the M pilot carriers and the adjacent carriers that are adjacent to the pilot carrier. Then, the decision unit 194 decides whether the phase difference fulfills the phase difference condition for each of the M phase differences, and by deciding whether the number of phase differences that fulfill the phase difference condition is greater than or equal to a predetermined threshold (the threshold is a value that is larger than 0 and less than or equal to M, for example M/2), decides whether the information symbol is a first type symbol (HTSIG).

If the number of pilot carriers included in the information symbol is N (N being an integer greater than or equal to 2), the type decision unit 190 may use one pilot carrier for the processing to decide the type of information symbol. In this case, for example, the phase difference detection unit 193 detects the phase difference between the one pilot carrier and the adjacent carriers adjacent to the one pilot carrier. Then, the decision unit 194 decides whether the information symbol is the first type symbol (HTSIG) by the decision unit 194 deciding whether the detected one phase difference fulfills the phase difference condition.

Note that there is an advantage in that the smaller the number of pilot carriers used in the processing for deciding the type of information symbol, the smaller the processing load pertaining to the processing for deciding the type of information symbol. Also, there is an advantage in that the larger the number of pilot carriers used in the processing for deciding the type of information symbol, the higher the precision of deciding the type of information symbol.

(6) Although in the above embodiment, an example is described of the number of pilot carriers included in the subcarrier constituting the information symbol being 4, the present invention is not limited to this, and the number of pilot carriers included in the subcarrier constituting the information symbol may be from 1 to 3, or greater than or equal to 5.

(7) Although in the above embodiment, the decision unit 194 decides whether the information symbol is the first type symbol (HTSIG) according to the number of phase differences that fulfill the phase difference condition, the present invention is not limited to this, and for example, the following may be used.

The decision unit 194 obtains an average value of the phase differences $\Delta\theta_1$ to $\Delta\theta_4$ detected by the phase difference detection unit 193, and decides whether the average value fulfills the phase difference condition. Then, the decision unit 194 decides that the information symbol is the first type symbol (HTSIG) if the average value fulfills the phase difference condition, and that the information symbol is the second type symbol (SIG or DATA) if the average value does not fulfill the phase difference condition.

(8) The processing for deciding the type of information symbol in the above embodiment can be applied not only to processing in which HTSIG is the first type symbol and SIG or DATA that has been modulated by BPSK, QPSK, 16 QAM, or 64 QAM is the second type symbol.

For example, the processing for deciding the type of information symbol in the present embodiment can be applied when there is a first type symbol and a second type symbol that have a relationship such that the phase difference between the pilot carrier and the data carrier of the first type symbol at the time of modulation is not the same as the phase difference between the pilot carrier and the data carrier of the second type symbol at the time of modulation.

To give an example, the first type symbol is set as an OFDM symbol in which a pilot carrier modulated according to the signal constellation shown in FIG. 3A and a data carrier modulated according to the signal constellation shown in FIG. 4A have been frequency division multiplexed, and the second type symbol is an OFDM symbol in which a pilot carrier and a data carrier modulated according to the signal constellation shown in FIG. 3A have been frequency division multiplexed.

(9) The processing for deciding the type of information symbol in the above embodiment can be applied not only to deciding whether the type is the first type symbol or the second type symbol, and can also be applied to deciding three or more symbol types in which the phase differences of the pilot carrier and the data carrier are different from each other.

(10) Although in the above embodiment, the read control unit 180 reads the adjacent carriers $AC_1$ to $AC_4$ after reading all of the pilot carriers $PC_1$ to $PC_4$ from the FFT unit 170, the present invention is not limited to this, and for example, the read control unit 180 may read the pilot carriers $PC_1$ to $PC_4$ and the adjacent carriers $AC_1$ to $AC_4$ alternately from the FFT unit 170.

(11) Although in the above embodiment, the read control unit 180 reads all of the subcarriers $SC_{-15}$ to $SC_{15}$ in ascending order of frequency after completing reading the adjacent carriers, the present invention is not limited to this. The read control unit 180, for example, may read the subcarriers in descending order of frequency from the FFT unit 170, or may read the subcarriers from the FFT unit 170 in an arbitrary order. Also, the read control unit 180 may read only the data carriers other than the pilot carriers, or may read only the data carriers other than the pilot carriers and the adjacent carriers.

(12) Although in the above embodiment, the pilot carrier extraction unit 191 and the adjacent carrier extraction unit 192, respectively, store the extracted pilot carriers $PC_1$ to $PC_4$ and adjacent carriers $AC_1$ to $AC_4$, the present invention is not limited to this, and for example the following may be used.

The pilot carrier extraction unit 191 stores the extracted pilot carriers $PC_1$ to $PC_4$. Then, the adjacent carrier extraction unit 192, in addition to outputting the extracted adjacent carriers to the phase difference detection unit 193 each time the adjacent carriers $AC_1$ to $AC_4$ are extracted without storing the adjacent carriers, may read the pilot carriers corresponding to the extracted adjacent carriers from the pilot carrier extraction unit 191, and output the pilot carriers to the phase difference detection unit 193.

(13) Although in the above embodiment, Fourier conversion is used as a means of separating the OFDM symbol into subcarriers, the present invention is not limited to this, and any means that enables separating an OFDM symbol into subcarriers, such as wavelet conversion, a filter bank, etc., may be used.

(14) Although in the above embodiment, an example is described of the received signal being an OFDM signal, the present invention is not limited to this, and the received signal may be a signal that has been frequency division multiplexed other than an OFDM signal.

(15) Although in the above embodiment, the description targets the IEEE 802.11n standard, the above embodiment is not only applicable to the IEEE 802.11n standard.

(16) The wireless communication device of the above embodiment may be realized typically as an LSI (Large Scale Integration) that is an integrated circuit. The circuits may be realized as individual chips, or alternatively all or a portion of the circuits may be realized as a single chip.

Here, an integrated circuit generated as described above may also be referred to as an IC (Integrated Circuit), a system LSI, a super LSI, or an ultra LSI, depending on the degree of integration.

Also, the integrated circuit is not limited to being LSI, but instead may be realized by a dedicated circuit or a general-purpose process. After LSI manufacture, the use of an FPGA (Field Programmable Gate Array) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

INDUSTRIAL APPLICABILITY

The present invention can be used in a reception apparatus of a wireless system in which a plurality of frame formats coexist.

The invention claimed is:

1. A signal decision apparatus for deciding a type of a received signal that is constituted from a plurality of subcarriers frequency division multiplexed with each other, comprising:
  a subcarrier separation unit operable to separate the received signal into the plurality of subcarriers, including a pilot carrier and a data carrier; and
  a type decision unit operable to decide, according to a relationship between the pilot carrier and the data carrier obtained as a result of the separation by the subcarrier separation unit, whether the received signal is a predetermined type of frequency-multiplexed signal including a pilot carrier that has been modulated in accordance with a first signal constellation, and a data carrier that has been modulated in accordance with a second signal constellation that is in a predetermined relationship with the first signal constellation, wherein
  the type decision unit includes
    a phase difference information detection subunit operable to detect, according to the pilot carrier and the data carrier, phase difference information pertaining to a phase difference between the pilot carrier and the data carrier, and
    a decision subunit operable to decide whether the received signal is the predetermined type of frequency-multiplexed signal by deciding whether the phase difference information detected by the phase difference information detection subunit fulfills a predetermined phase difference condition that is determined based on a predetermined phase difference range that is fulfilled by a phase difference between the pilot carrier and the data carrier of the predetermined type of frequency-multiplexed signal at a time of signal reception.

2. The signal decision apparatus of claim 1, wherein
each of the first signal constellation and the second signal constellation includes two respective signal points on an IQ plane, and
the predetermined relationship is that a straight line connecting the two signal points in the first signal constellation is orthogonal to a straight line connecting the two signal points in the second signal constellation.

3. The signal decision apparatus of claim 2, wherein
the two signal points in the first signal constellation are on a Q axis, and the two signal points in the second signal constellation are on an I axis.

4. The signal decision apparatus of claim 1, wherein
there is a plurality of data carriers, of which two are adjacent to the pilot carrier, and
the phase difference information detection subunit uses the pilot carrier and at least one of the two data carriers that are adjacent to the pilot carrier for the detection of the phase difference information.

5. The signal decision apparatus of claim 1, wherein
there is a plurality of pilot carriers,
if a number of pilot carriers is N, N being an integer greater than or equal to 2,
the phase difference information detection subunit detects the phase difference information for each of M pilot carriers, M being an integer between 2 and N inclusive, and
the decision subunit performs the decision of whether the received signal is the predetermined type of frequency-multiplexed signal in accordance with the phase difference information of the M pilot carriers detected by the phase difference information detection subunit.

6. The signal decision apparatus of claim 5, wherein
there is a plurality of data carriers, of which two are adjacent to each of the M pilot carriers, and
the phase difference information detection subunit uses each of the M pilot carriers and at least one of the two data carriers that are adjacent to each of the M pilot carriers for the detection of the phase difference information.

7. The signal decision apparatus of claim 1, wherein
there is a plurality of pilot carriers,
if a number of pilot carriers is N, N being an integer greater than or equal to 2,
the phase difference information detection subunit detects the phase difference information with respect to one of the N pilot carriers, and
the decision subunit performs the decision of whether the received signal is the predetermined type of frequency-multiplexed signal in accordance with the phase difference information.

8. The signal decision apparatus of claim 1, further comprising:
a read control unit operable to read first, from the subcarrier separation unit, the pilot carrier and the data carrier used by the type decision unit for the decision.

9. A signal decision method for deciding a type of a received signal that is constituted from a plurality of subcarriers frequency division multiplexed with each other, comprising:
  a subcarrier separation step of separating the received signal into the plurality of subcarriers, including a pilot carrier and a data carrier; and
  a type decision step of deciding, according to a relationship between the pilot carrier and the data carrier obtained as a result of the separation performed in the subcarrier separation step, whether the received signal is a predetermined type of frequency-multiplexed signal including a pilot carrier that has been modulated in accordance with a first signal constellation, and a data carrier that has been modulated in accordance with a second signal constellation that is in a predetermined relationship with the first signal constellation, wherein
  the type decision step includes
    a phase difference information detection sub-step of detecting, according to the pilot carrier and the data carrier, phase difference information pertaining to a phase difference between the pilot carrier and the data carrier, and a decision sub-step of deciding whether the received signal is the predetermined type of frequency-multiplexed signal by deciding whether the phase difference information detected in the phase difference information detection sub-step fulfills a predetermined phase difference condition that is determined based on a predetermined phase difference range that is fulfilled by a phase difference between the pilot carrier and the data carrier of the predetermined type of frequency-multiplexed signal at a time of signal reception.

* * * * *